(12) United States Patent
Cowling et al.

(10) Patent No.: US 11,484,007 B2
(45) Date of Patent: Nov. 1, 2022

(54) MILKING ARRANGEMENT

(71) Applicant: DELAVAL HOLDING AB, Tumba (SE)

(72) Inventors: Tony Cowling, Tumba (SE); Jeffery Gallagher, Tumba (SE); Scott Pawlowicz, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 17/047,559

(22) PCT Filed: Apr. 12, 2019

(86) PCT No.: PCT/SE2019/050342
§ 371 (c)(1),
(2) Date: Oct. 14, 2020

(87) PCT Pub. No.: WO2019/203714
PCT Pub. Date: Oct. 24, 2019

(65) Prior Publication Data
US 2021/0144957 A1    May 20, 2021

(30) Foreign Application Priority Data
Apr. 19, 2018   (SE) .................................. 1850451-4

(51) Int. Cl.
*A01K 1/12* (2006.01)
*E05F 15/70* (2015.01)
*A01K 1/00* (2006.01)

(52) U.S. Cl.
CPC .............. *A01K 1/12* (2013.01); *A01K 1/0017* (2013.01); *E05F 15/70* (2015.01)

(58) Field of Classification Search
CPC .. A01K 1/0017; A01K 1/0023; A01K 1/0029; A01K 1/12

USPC ....................... 119/14.03, 520, 524
See application file for complete search history.

(56) References Cited

U.S. PATENT DOCUMENTS 4,362,127 A * 12/1982 Nielsen ................... A01K 1/12
                                                            119/14.03
4,854,268 A *  8/1989 Kipe ....................... A01K 1/12
                                                            119/14.03
(Continued)

FOREIGN PATENT DOCUMENTS

CN      102711448 A     10/2012
CN      104254245 A     12/2014
(Continued)

OTHER PUBLICATIONS

International Search Report for PCT/SE2019/050342, dated Jun. 28, 2019, 3 pages.
(Continued)

*Primary Examiner* — Joshua J Michener
(74) *Attorney, Agent, or Firm* — Nixon & Vanderhye

(57) ABSTRACT

A milking arrangement includes plural milking places, each milking place having a primary end and an opposite secondary end, an entrance at the primary end, a front side and a rear side, which both extend in parallel with the longitudinal axis, a plurality of sequence gates arranged between the front side and the rear side, each of the sequence gates being pivotable between a closed position and an open position, each sequence gate being only pivotable from its closed position to its open position in a pivotation direction in which the front end is pivoted into a milking place towards the front side of the milking arrangement, main extension planes of the sequence gates being aligned when the sequence gates are in their closed position, with a lower edge of each sequence gate defining a bulge that extends downwards.

18 Claims, 3 Drawing Sheets

(56) References Cited

U.S. PATENT DOCUMENTS

| | | | | |
|---|---|---|---|---|
| 4,930,447 A * | 6/1990 | Peacock | ............... | A01K 1/0017 119/524 |
| 5,259,335 A | 11/1993 | Moreau | | |
| 5,615,637 A * | 4/1997 | Nelson | ................ | A01K 1/0017 119/14.03 |
| 7,644,681 B2 * | 1/2010 | Moreau | ............... | A01K 1/0209 119/14.03 |
| 8,291,859 B2 * | 10/2012 | Leyrit | .................... | A01K 1/123 119/14.03 |
| 2015/0189854 A1 | 7/2015 | Krone et al. | | |
| 2017/0359997 A1 * | 12/2017 | Zartman | ............. | A01K 1/0029 |

FOREIGN PATENT DOCUMENTS

| | | | |
|---|---|---|---|
| CN | 104822259 A | 8/2015 | |
| CN | 205585009 U | 9/2016 | |
| DE | 38 77 195 T2 | 7/1993 | |
| EP | 0 350 558 | 1/1990 | |
| EP | 0 734 649 | 10/1996 | |
| FR | 2730128 A1 * | 8/1996 | ............... A01K 1/12 |
| GB | 1 395 296 A | 5/1975 | |
| GB | 1 437 387 A | 5/1976 | |
| TW | M328777 U | 3/2008 | |
| WO | WO-9300798 A1 * | 1/1993 | ........... A01K 1/0011 |
| WO | 96/13153 | 5/1996 | |
| WO | WO-2008111036 A1 * | 9/2008 | ........... A01K 1/0011 |
| WO | WO-2008135546 A1 * | 11/2008 | ............... A01K 1/12 |

OTHER PUBLICATIONS

Written Opinion of the ISA for PCT/SE2019/050342, dated Jun. 28, 2019, 7 pages.
Search Report for SE1850451-4, dated Nov. 19, 2018, 2 pages.
Office Action issued in Chinese Patent Application No. 201980015764.9 dated Jan. 17, 2022.

\* cited by examiner

MILKING ARRANGEMENT

This application is the U.S. national phase of International Application No. PCT/SE2019/050342 filed 12 Apr. 2019, which designated the U.S. and claims priority to SE Patent Application No. 1850451-4 filed 19 Apr. 2018, the entire contents of each of which are hereby incorporated by reference.

TECHNICAL FIELD

The present invention relates to a milking arrangement comprising
- a plurality of milking places arranged side by side after each other along a longitudinal axis, each milking place having a width W and being configured to receive a respective animal to be milked,
- a primary end and a secondary end opposite to the primary end, wherein the milking arrangement extends along the longitudinal axis from the primary end to the secondary end,
- an entrance at said primary end,
- a front side and a rear side, which both extend in parallel with the longitudinal axis,
- a plurality of sequence gates arranged between said front side and said rear side, wherein each of said sequence gates is pivotable between a closed position, in which the sequence gate defines a temporary barrier against entrance into each of two neighbouring milking places, and an open position in which it forms a side wall between said two neighbouring milking places, wherein each sequence gate has a front end, which, in the closed position of the sequence gate, is directed towards said secondary end of the milking arrangement, and a rear end, which in the closed position of the sequence gate, is directed towards said primary end of the milking arrangement,
- wherein each of said sequence gates is only pivotable from its closed position to its open position in a pivotation direction in which said front end is pivoted into a milking place towards the front side of the milking arrangement, and
- wherein the main extension planes of the sequence gates are in alignment when the sequence gates are in their closed position.

BACKGROUND ART

Milking arrangements have recently been developed which comprises a drive device for moving a sequence gate assembly from a lower position in which the sequence gates are at the level of animals standing in their milking places to a second position, which is an elevated position in which the sequence gates are located at a level above and behind animals standing in the respective milking places, wherein the sequence gates are configured to move from said second position to the lower position with the sequence gates in their closed position such that the sequence gates urge animals standing in their respective milking places to move towards the front side to leave the milking places through the front side.

For such milking arrangements, and possibly also for other milking arrangement designs, non-overlapping sequence gates, i.e. sequence gates for which the main extension planes of the sequence gates are in alignment when the sequence gates are in their closed position, have been considered to be advantageous.

A problem with a non-overlapping sequence gate is that cows can more easily open a gate and enter into a stall too early, this is referred to as "short-loading". Short-loading is a problem because it leaves some stall places empty of cows, resulting in less cows being milked during the day.

It is therefore an object of the present invention to present milking arrangement that has non-overlapping sequence gates that have a design which prevents or reduces the risk of "short-loading" of the animals entering their milking places in the milking arrangement through the sequence gates.

SUMMARY OF THE INVENTION

The object of the invention is achieved by means of the milking arrangement defined initially in this description as well as in the preamble of claim 1, which milking arrangement is characterised in that each sequence gate has a lower edge extending from said rear end to said front end of the sequence gate, and that, in a region were the lower edge meets an edge of said front end, the lower edge defines a bulge that extends downwards to a lower level than the level of a lower rear end of the neighbouring sequence gate.

The bulge has the effect of preventing the animal, typically a cow, which enters with its head down from finding a gap between neighbouring gates. Typically, if the animal finds the gap, it will try to enter the milking place by pushing the sequence gate into the milking place and open it, thereby causing a "short loading" to occur. The lower level to which the bulge extends should be at least 3 cm, preferably at least 5 cm below the level of a lower rear end of the neighbouring sequence gate.

According to an embodiment of the invention, the rear end of each sequence gate has a recess and the front end of each sequence gate has a nose portion, wherein said nose portion of a sequence gate extends into the recess of a neighbouring sequence gate when both sequence gates are in their closed position. The nose portion makes it easier for an animal to open the sequence gate by pushing on the nose portion of the gate.

According to one embodiment, the nose portion is a central nose portion and the recess is a central recess. Central is referred as positioned approximately in the middle between the lower edge and an upper edge of the sequence gate.

Each sequence gate is arranged to pivot around a pivoting point. The pivoting point is a point along the longitudinal direction of the sequence gate where the sequence gate is hinged to a structural element. The structural element may be a post or the like. According to one embodiment, the structural element is a part of a device configured to move the sequence gate between a lower position, in which it is at the level of the animals, and an elevated position, in which it is above and behind an animal standing in its assumed milking position in a milking place. In the lower position of the sequence gate, the sequence gate is configured to pivot around a vertical axis.

According to one embodiment, an upper part of each sequence gate extending from the pivoting point of the gate towards the primary end covers at least 50%, preferably at least 80% of the width W of a milking place when the sequence gate is in the closed position. Animals, typically cows, have a tendency to raise their head and follow an upper part of the sequence gates and may try to enter a milking place by pushing on the upper edge of the sequence gates. If a major part of the upper edge of each sequence gate extends from the pivoting point of that sequence gate towards the primary end of the milking arrangement, the risk for such opening is reduced.

According to one embodiment, a lower part of each sequence gate extending from the pivoting point of the gate towards the primary end of the milking arrangement covers at least 50%, preferably at least 80% of the width W of a milking place when the sequence gate is in the closed position. Animals, typically cows, also has a tendency to lower their head and follow a lower part of the sequence gates and may try to enter a milking place by pushing on the lower edge of the sequence gates. If a major part of the lower edge of each sequence gate extends from the pivoting point of that sequence gate towards the primary end of the milking arrangement, the risk for such opening is reduced.

According to one embodiment, the nose portion of each sequence gate extending from the pivoting point of the sequence gate towards the secondary end of the milking arrangement covers at least 30%, preferably at least 50% of the width W of a milking place when the sequence gate is in a closed position. A relatively long nose portion will facilitate opening of the sequence gate and reduce the risk of having an animal entering a milking place without opening the sequence gate.

According to one embodiment, there is a gap between a rear end edge and a front end edge of each pair of neighbouring sequence gates when the sequence gates are in a closed position, wherein said gap has a width w which is less than 10 cm, preferably less than 5 cm, along at least 80%, preferably along at least 90% of the total length of the gap. Animals, typically cows, have a tendency to be curious, and tend to search with their nose after a gap between two neighbouring sequence gates that are in their closed positions. In order to reduce the risk of the animal finding such a gap and trying to enter the milking place as a consequence thereof, thereby by causing a short loading, the gap should not be too large.

According to one embodiment, each sequence gate comprises an opaque sheet. Animals, typically cows, have a tendency to try to look into a milking place and enter it if it is empty, which may result in short loading. Solutions using gates formed by grid-like structures or non-opaque sheets will enable the animal too easily see that a milking place is empty, and will thus trigger short loading. The suggested solution thereby reduces the risk of short loading.

Preferably, the area covered by two adjacent sequence gates in their closed positions, thereby forming barrier into one common milking place, has a medium height of at least 0.3 meter, preferably at least 0.4 meter from its lower edge to its upper edge. Variations in height may exist along the longitudinal direction of the sequence gate.

According to one embodiment, the milking arrangement comprises a drive device for moving the sequence gates from a lower position in which they are at the level of animals standing in the milking places to a second position, which is an elevated position in which the sequence gates are located at a level above and behind animals standing in the respective milking places, wherein the sequence gates are configured to move from said second position to the lower position with the sequence gates in their closed position such that the sequence gates urge animals standing in their respective milking places to move towards the front side to leave the milking places through the front side. When the sequence gates are in their lower position, the distance between the floor and the sequence gate is not more than 1.0 meter, preferably not more than 0.75 meter.

Further features and advantages of the present invention will be presented in the following detailed description.

BRIEF DESCRIPTION OF THE DRAWINGS

Hereinafter follows a detailed description of exemplifying embodiments with reference to the annexed drawing, on which.

DETAILED DESCRIPTION

Figure 1:
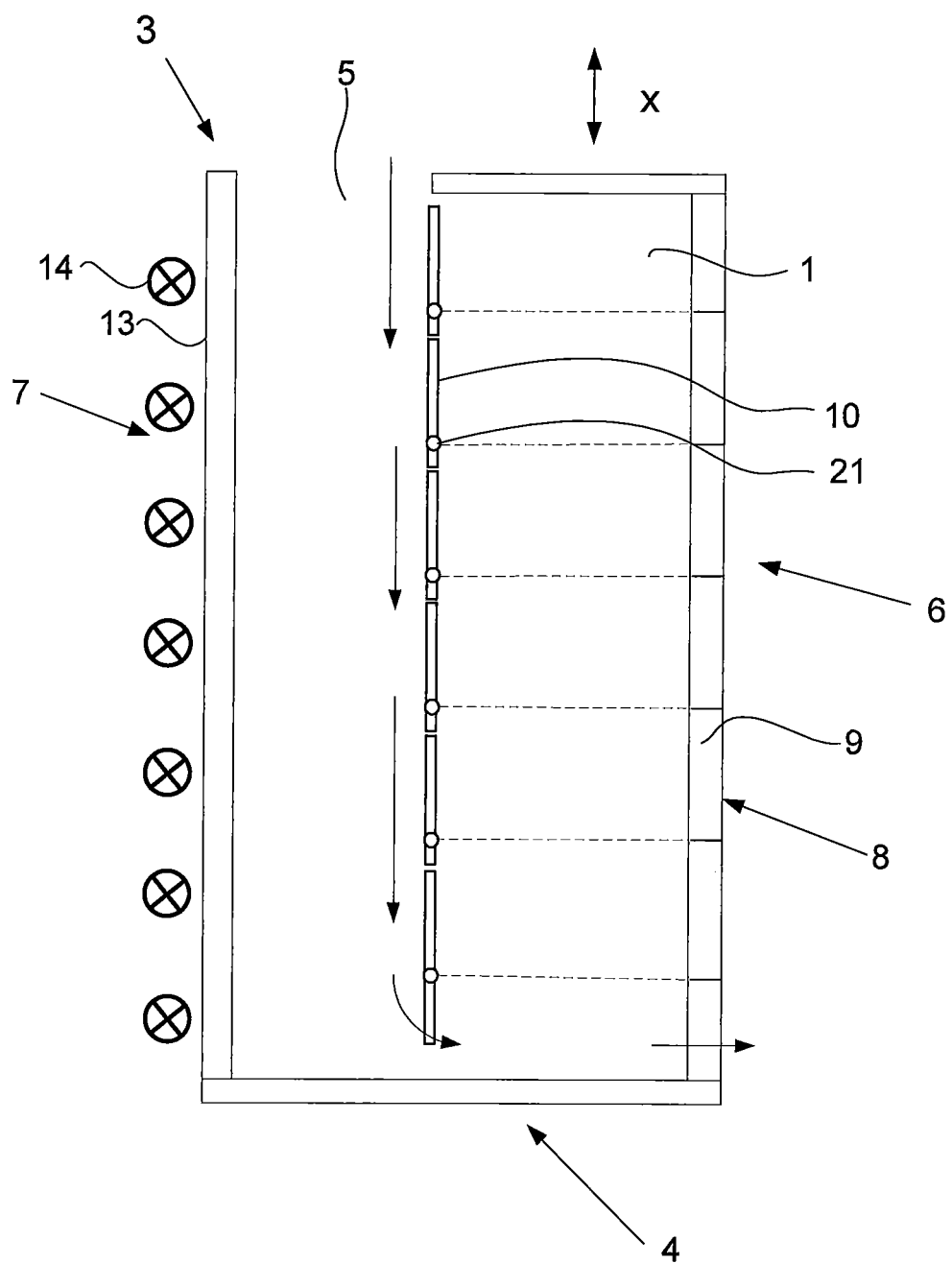
FIG. 1 is a schematic representation of a milking arrangement according to the invention.

FIG. 1 shows an embodiment of a milking arrangement according to the invention that comprises a plurality of milking places 1 arranged side by side after each other along a longitudinal axis x, each milking place being configured to receive a respective animal to be milked.

The milking arrangement further comprises a primary end 3 and a secondary end 4 opposite to the primary end 3, wherein the milking arrangement extends along the longitudinal axis x from the primary end 3 to the secondary end 4. At the primary end 3 there is provided an entrance 5 through which animals, in particular cows, are assumed to enter the milking arrangement. The milking arrangement further comprises a front side 6 and a rear side 7, which both extend in parallel with the longitudinal axis x. A wall element 13, for example formed by a fence or one or more horizontal bars or the like and extending in the longitudinal direction x from the primary end 3 to the secondary end 4, defines the rear side 7 of the milking arrangement.

Milking apparatus 14, to be attached to the animals by an operator located at the rear side 7 are also provided as a part of the milking arrangement, and are schematically shown in FIG. 1.

Furthermore the milking arrangement comprises a front gate assembly 8 comprising a plurality of front gates 9 that are movable between a first position in which the close the front side 6 to prevent the animals from leaving the respective milking place 1 through the front side 6, and a second position, configured to permit the animals to leave the respective milking place 1 through the front side 6. Preferably, the second position is an elevated position, wherein the front gate assembly 8 comprises an elevation device able of elevating the front gates 9 of the front gate assembly 8, individually or in groups, from the first position to the second position.

The milking arrangement further comprises a plurality of sequence gates 10 arranged between said front side 6 and said rear side 7, wherein each of said sequence gates is pivotable between a closed position, in which the sequence gate 10 defines a barrier against entrance into each of two neighbouring milking places, and an open position in which it forms a side wall between said two neighbouring milking places. Each sequence gate 10 has a front end 11 (see FIGS. 2 and 3), which, in the closed position of the sequence gate 10, is directed towards said secondary end 4 of the milking arrangement, and a rear end 12, which in the closed position of the sequence gate 10, is directed towards said primary 3 end of the milking arrangement.

Each of said sequence gates 10 is only pivotable from its closed position to its open position in a pivotation direction in which said front end 11 is pivoted into a milking place 1 towards the front side 6 of the milking arrangement. Accordingly, the sequence gates 10 are prevented from being pivoted from their closed open position to their open position by moving the rear end 12 into a milking place 1 towards the front side 6, preferably by provision of a locking device in connection to a joint where the pivotation of the sequence gate relative a structural element is provided for. Each sequence gate 10 comprises a generally flat sheet, wherein the main extension planes of the sequence gates 10 are in alignment and parallel with said longitudinal direction x when the sequence gates 10 are in their closed position (see FIG. 1). Each sequence gate 10 comprises an opaque sheet.

Figure 2:
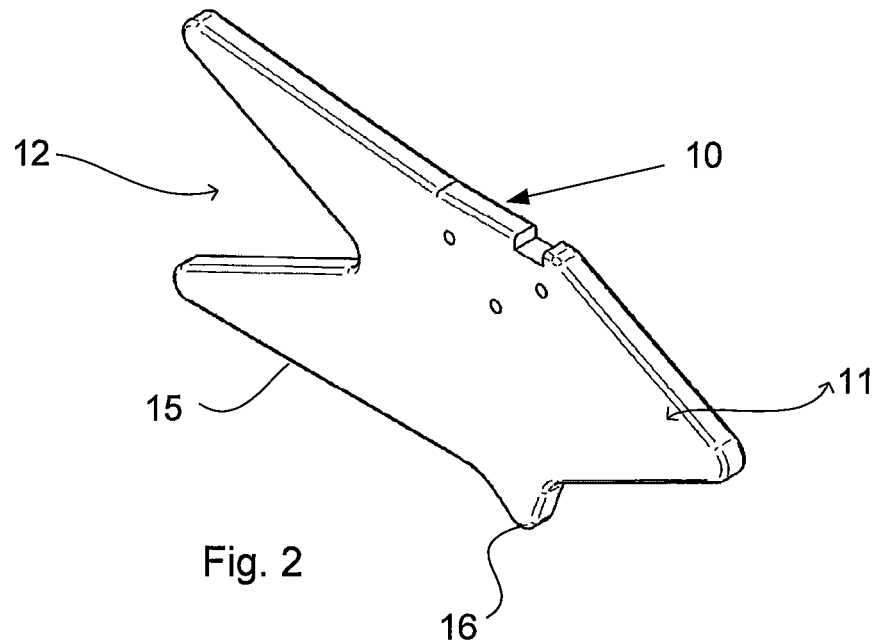
FIG. 2 is a perspective view of a sequence gate according to a first embodiment.
Figure 3:
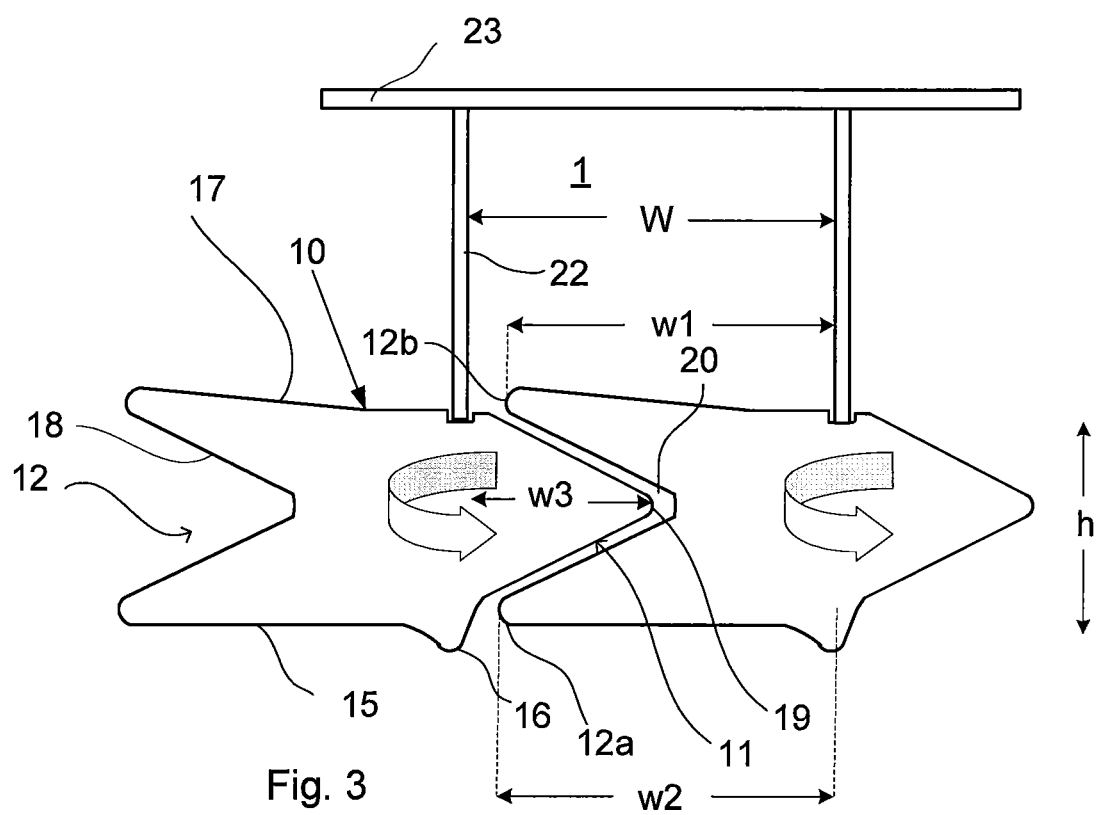
FIG. 3 is a side view shown two neighbouring sequence gate in a closed position.

Reference is now made to FIGS. 2 and 3. FIG. 3 shows a pair of neighbouring sequence gates 10 as seen from the rear side 7 of the milking arrangement. The sequence gates 10 are in the closed position and forms a barrier for entrance into the milking place 1 in a direction towards the front side 6 of the milking arrangement. Each sequence gate 10 has a lower edge 15 extending from said rear 12 end to said front end 11 of the sequence gate, and that, in a region were the lower edge 15 meets an edge of said front end, the lower edge 15 defines a bulge 16 that extends downwards to a lower level, here approximately 10 cm lower, than the level of a lower rear end 12a of the neighbouring sequence gate 10. The sequence gates are positioned at the same height from the floor. In this specific case, the lower edges 15 are approximately 1 meter above ground. The area covered by two adjacent sequence gates 10 in their closed positions, thereby forming barrier into one common milking place, has a medium height h of approximately 0.4 meter from its lower edge to its upper edge. Here, with the design of the sequence gates shown in FIGS. 2 and 3, each individual sequence gate 10 has medium height h from the lower edge 15 to an upper edge 17 of approximately 0.4 meter.

The rear end 12 of each sequence gate 10 has a central recess 18 and the front end 11 of each sequence gate 10 has a central nose portion 19, wherein said nose portion 19 of a sequence gate 10 extends into the recess 18 of a neighbouring sequence gate 10 when both sequence gates 10 are in their closed position.

There is a gap 20 between a rear end edge and a front end edge, i.e. the edge that defines the recess 18 and the edge that defines said nose portion 19, of each pair of neighbouring sequence gates 10 when the sequence gates 10 are in the closed position, wherein said gap 20 has a width which is less than 10 cm, preferably less than 5 cm, along at least 80%, preferably along at least 90% of the total length of the gap.

Each sequence gate 10 is arranged to pivot around a pivoting point 21 (see FIG. 1). The sequence gate 10 is either pivotally arranged relative a structural member 22 by which it is suspended. Alternatively, pivotation is obtained by the structural member 22 itself being pivotable relative a further structural member 23 to which it is attached. The pivotation of the sequence gate 10 from the closed position to the open position caused by the action of an animal, is a pivotation around a generally vertical axis.

Each milking place has a width W in the region of the sequence gate 1, and an upper part, defined by the upper edge 17, of each sequence gate 10 extending from the pivoting point 21 of the gate towards the primary end 3, i.e. to an upper rear end 12b of the sequence gate 10, has a length w1 of approximately 80% of the width W of a milking place 1 when the sequence gate 10 is in the closed position. The width W of milking place is the distance between the pivoting points 21 of neighbouring sequence gates 10.

A lower part of each sequence gate 10, defined by the lower edge 15 (including part of the bulge 16), extending from the pivoting point 21 of the gate 10 towards the primary end 3 of the milking arrangement, i.e. to the lower rear end 12a, has a length w2 of approximately 80% of the width W of a milking place 1 when the sequence gate 10 is in the closed position.

The nose portion 19 of each sequence gate 10 extending from the pivoting point of the sequence gate towards the secondary end 4 of the milking arrangement has a length w3 which is approximately 40% of the width W of the milking place 1 when the sequence gate 10 is in a closed position.

The milking arrangement further comprises drive device for moving the sequence gates 10 from a lower position in which they are at the level of animals standing in the milking places 1 to a second position, which is an elevated position in which the sequence gates 10 are located at a level above and behind animals standing in the respective milking places 1, wherein the sequence gates 10 are configured to move from said elevated position to the lower position with the sequence gates 10 in their closed position such that the sequence gates 10 urge animals standing in their respective milking places 1 to move towards the front side 6 to leave the milking places 1 through the front side 6 when a milking session is finished. The drive device is only schematically represented in FIG. 3 by the structural member 23, and may include a motor or pneumatic or hydraulic device for enabling said motion between the lower and the elevated positions of the sequence gates. Preferably, the motion from the lower position to the elevated position is performed with the sequence gates 10 in their open position, as animals have entered the milking places and are being milked, whereinafter they are pivoted back to their closed position while being in the elevated position, either by means of drive device or by a suitable return spring device.

Figure 4:
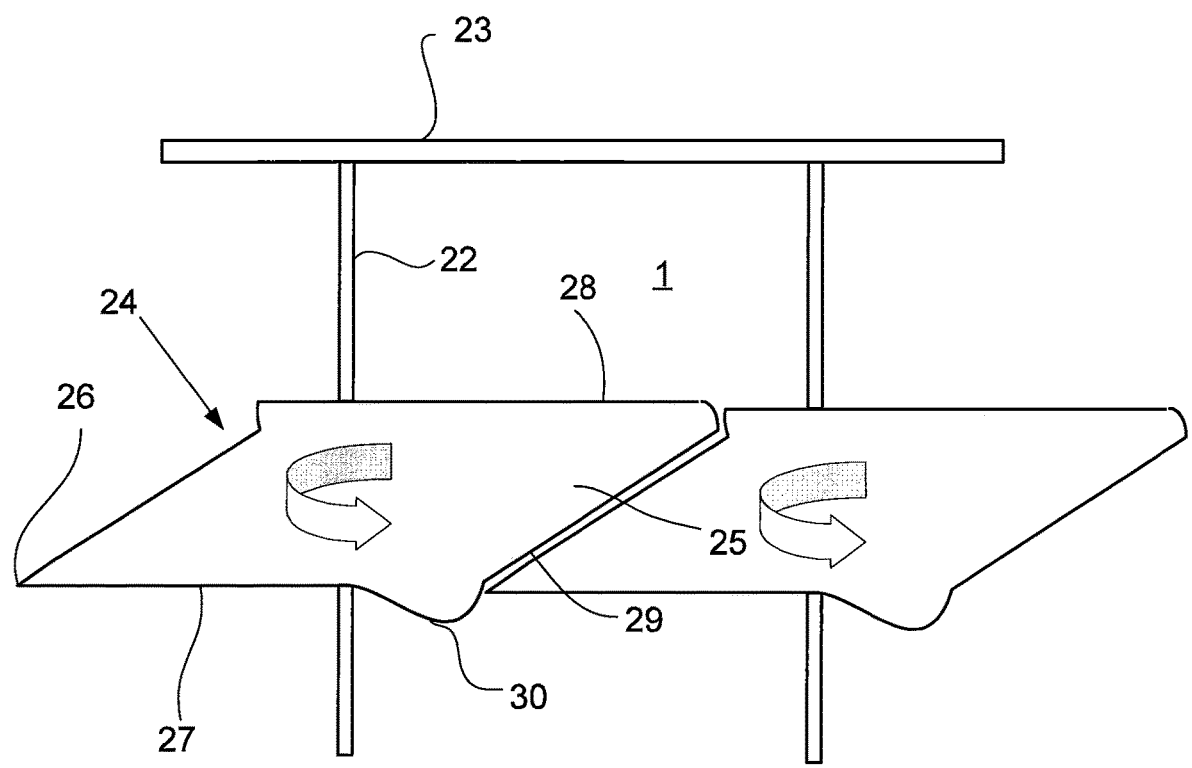
FIG. 4 is a side view of an alternative embodiment of two neighbouring sequence gate in a closed position.

FIG. 4 shows an alternative embodiment of a sequence gate design. The sequence gate 24 has a front end 25, a rear end 26, a lower edge 27, and an upper edge 28. The lower edge 27 extends from said rear end 26 to said front end 25 of the sequence gate 24, and in a region were the lower 27 edge meets an edge 29 of said front end 25, the lower edge defines a bulge 30 that extends downwards to a lower level than the level of a lower rear end of the neighbouring sequence gate 24.

The invention claimed is:

1. A milking arrangement comprising:
a plurality of milking places (1) arranged side by side after each other along a longitudinal axis (x), each of the milking places (1) having a width (W) and being configured to receive a respective animal to be milked;
a primary end (3) and a secondary end (4) opposite to the primary end (3), wherein the milking arrangement extends along the longitudinal axis from the primary end (3) to the secondary end (4);
an entrance (5) at said primary end (3);
a front side (6) and a rear side (7), the front side (6) and the rear side (7) both extending in parallel with the longitudinal axis (x); and
a plurality of sequence gates (10) arranged between said front side (6) and said rear side (7),
wherein each of said sequence gates (10) is pivotable between a closed position, in which each of said sequence gates (10) defines a temporary barrier against entrance into each of two neighbouring ones of the milking places (1), and an open position in which each of said sequence gates (10) forms a side wall between said two neighbouring ones of the milking places (1), wherein each of said sequence gates (10) has a front end (11), which, in the closed position of the sequence gate (10), is directed towards said secondary end (4) of the milking arrangement, and a rear end (12), which in the closed position of the sequence gate (10), is directed towards said primary end (3) of the milking arrangement, wherein each of said sequence gates (10) is only pivotable from the closed position to the open position in a pivotation direction in which said front end (11) is pivoted into one of the milking places (1) towards the front side (6) of the milking arrangement, wherein main extension planes of the sequence gates (10) are in alignment when the sequence gates (10) are in the closed position, wherein each of said sequence gates (10) has a lower edge (15) extending from said rear end (12) to said front end (11) of the sequence gate (10), wherein, at a lower rear end (12*a*) of each of said sequence gates, where said lower edge (15) meets an edge of said rear end (12), said lower edge (15) is at a first level, wherein, in a region where the lower edge (15) meets an edge of said front end (11), the lower edge (15) defines a bulge (16) that extends downwards to a lower, second level such that the second level of a first of the sequence gates is lower than the first level of the lower rear end (12*a*) of a neighbouring second of the sequence gates (10), the first of the sequence gates (10) being located closer to the primary end (3) of the milking arrangement than the neighbouring second of the sequence gates (10), wherein the rear end (12) of each of said sequence gates (10) has a recess (18) and the front end (11) of each of said sequence gates (10) has a nose portion (19), wherein said nose portion (19) of the first of the sequence gates (10) extends into the recess (18) of the neighbouring second of the sequence gates (10) when both the first and the neighbouring second of the sequence gates (10) are in the closed position, and wherein the nose portion (19) is a central nose portion (19) and the recess (18) is a central recess (18).

2. The milking arrangement according to claim 1, wherein each of said sequence gates (10) is arranged to pivot around a pivoting point (21).

3. The milking arrangement according to claim 2, wherein an upper part of each of said sequence gates (10) extending from the pivoting point (21) of the sequence gate towards the primary end (3) covers at least 50% of the width (W) of the milking place (1) when the sequence gate (10) is in the closed position.

4. The milking arrangement according to claim 2, wherein a lower part of each of said sequence gates (10) extending from the pivoting point (21) of the sequence gate (10) towards the primary end (3) of the milking arrangement covers at least 50% of the width (W) of the milking place (1) when the sequence gate (10) is in the closed position.

5. The milking arrangement according to claim 1, wherein the nose portion (19) of each of said sequence gates (10) extending from a pivoting point of the sequence gate (10) towards the secondary end (4) of the milking arrangement covers at least 30% of the width (W) of the milking place (1) when the sequence gate (10) is in the closed position.

6. The milking arrangement according to claim 1, wherein there is a gap (20) between a rear end edge and a front end edge of neighbouring ones of the sequence gates (10) when the sequence gates (10) are in the closed position, and wherein said gap has a width (w) which is less than 10 cm along at least 80% of a total length of the gap (20).

7. The milking arrangement according to claim 1, wherein each of said sequence gates (10) comprises an opaque sheet.

8. The milking arrangement according to claim 1, further comprising a drive device (23) for moving the sequence gates (10) from a lower position in which the sequence gates (10) are at a level of animals standing in the milking places (1) to a second position, which is an elevated position in which the sequence gates (10) are located at a level above and behind animals standing in the respective milking places (1), wherein the sequence gates (10) are configured to move from said second position to the lower position with the sequence gates (10) in the closed position such that the sequence gates (10) urge animals standing in respective milking places (1) to move towards the front side (6) to leave the milking places (1) through the front side (6).

9. The milking arrangement according to claim 1, wherein, each of said sequence gates (10) is arranged to pivot at a pivoting point around a structural member (22), and the bulge (30) is located between the structural member (22) and the front end (11) of the sequence gate (10).

10. The milking arrangement according to claim 9, wherein the second level to which the bulge (16) of the first of the sequence gates (10) extends downwards to is at least 3 cm below the first level at the lower rear end (12*a*) of the neighbouring second sequence gate (10).

11. The milking arrangement according to claim 9, wherein the second level to which the bulge (16) of the first of the sequence gates (10) extends downwards to is at least 5 cm below the first level at the lower rear end (12*a*) of the neighbouring second sequence gate (10).

12. The milking arrangement according to claim 9, wherein, each of said sequence gates comprises a flat sheet that comprises an upper edge of the sequence gate that extends from the front end (11) to the rear end (12) and includes the bulge of the lower edge (15) of the sequence gate, and main extension planes of the flat sheets are in alignment when the sequence gates (10) are in the closed position.

13. The milking arrangement according to claim 12, wherein, there is a gap (20) between a rear end edge and a front end edge of neighbouring ones of the sequence gates (10) when the sequence gates (10) are in the closed position, and wherein said gap has a width (w) that is less than 10 cm along at least 80% of a total length of the gap (20).

14. The milking arrangement according to claim 1, wherein the second level to which the bulge (16) of the first of the sequence gates (10) extends downwards to is at least 3 cm below the first level at the lower rear end (12*a*) of the neighbouring second sequence gate (10).

15. The milking arrangement according to claim 1, wherein the second level to which the bulge (16) of the first of the sequence gates (10) extends downwards to is at least 5 cm below the first level at the lower rear end (12*a*) of the neighbouring second sequence gate (10).

16. The milking arrangement according to claim 1, wherein the second level to which the bulge (16) of the first of the sequence gates (10) extends downwards to is at least 3 cm below the first level at the lower rear end (12*a*) of the first sequence gate (10).

17. The milking arrangement according to claim 1, wherein the second level to which the bulge (16) of the first of the sequence gates (10) extends downwards to is at least 5 cm below the first level at the lower rear end (12*a*) of the first sequence gate (10).

18. The milking arrangement according to claim 1, wherein,
   each of said sequence gates comprises a flat sheet that comprises an upper edge of the sequence gate that extends from the front end (11) to the rear end (12) and includes the bulge of the lower edge (15) of the sequence gate, and
   main extension planes of the flat sheets are in alignment when the sequence gates (10) are in the closed position.

* * * * *